United States Patent
Jeong et al.

(10) Patent No.: US 6,894,119 B2
(45) Date of Patent: May 17, 2005

(54) THERMOPLASTIC ELASTOMER COMPOSITION FOR POWDER-MOLDING

(75) Inventors: Kie Youn Jeong, Kyungki-do (KR); Choong-Woo Nam, Daejeon-si (KR); Ho-Chul Kang, Daejeon-si (KR)

(73) Assignee: Hyundai Motor Company and Hanwha L&C Corporation, Seoul (KR)

( * ) Notice: Subject to any disclaimer, the term of this patent is extended or adjusted under 35 U.S.C. 154(b) by 0 days.

(21) Appl. No.: 10/331,240

(22) Filed: Dec. 30, 2002

(65) Prior Publication Data
US 2004/0010083 A1 Jan. 15, 2004

(30) Foreign Application Priority Data

Jul. 9, 2002 (KR) .................. 10-2002-0039569

(51) Int. Cl.⁷ .............. C08F 8/00; C08L 9/00; C08L 23/00; C08L 23/04; C08L 25/02
(52) U.S. Cl. .............. 525/191; 525/232; 525/240; 525/241
(58) Field of Search .................. 525/191, 232, 525/240, 241

(56) References Cited

FOREIGN PATENT DOCUMENTS

| JP | 2000-204207 A | * | 7/2000 |
| JP | 2001-226542 A | * | 8/2001 |

OTHER PUBLICATIONS

English translation of JP–2000–204207–A.*

English translation of JP–2001–226542–A.*

* cited by examiner

Primary Examiner—Nathan M. Nutter
(74) Attorney, Agent, or Firm—Morgan Lewis & Bockius LLP

(57) ABSTRACT

Disclosed is an olefinic thermoplastic composition for powder-molding, more particularly to a composition comprising polypropylene resin, hydrogenated styrene-butadiene rubber or styrene-ethylene-butylene-styrene copolymer rubber and ethylene-octene copolymer elastomer, which has a good melt fluidity, tensile strength and folding stability, and can be used for powder-molding of automobile interior materials and covering materials.

15 Claims, No Drawings

THERMOPLASTIC ELASTOMER COMPOSITION FOR POWDER-MOLDING

FIELD OF THE INVENTION

The present invention relates to an olefinic thermoplastic composition for powder-molding, more particularly to a composition comprising polypropylene resin, hydrogenated styrene-butadiene rubber or styrene-ethylene-butylene-styrene copolymer rubber, and ethylene-octene copolymer elastomer, which has a good melt fluidity, tensile strength and folding stability, and can be used for powder-molding of automobile interior materials and covering materials. The invention also relates to surfaces in an automobile made from the olefinic thermoplastic composition for powder-molding.

BACKGROUND OF THE INVENTION

Surface materials or covering materials for automobile interior, such as instrument panels, door trims, a console box, arm-rest, head-rest, require lightness, high quality, complex and elaborate shape, and now also impact resistance. Using instrument panels as an example, these panels have numerous openings, and while separable door-type passenger-seat air bags had been used previously, the use of concealed passenger-seat air bags has been on increase recently for improved appearance and simplicity of process.

For the conventional surface materials or covering materials for automobile interior, there are vacuum-molded materials made of polyvinyl chloride (hereinafter referred to as "PVC") resin and acrylonitrile-butadiene-styrene-copolymer resin (hereinafter referred to as "ABS") sheets, powder-molded materials made of PVC resin and plasticizer, sol-molded materials made of paste PVC resin and plasticizer through emulsion polymerization, and vacuum-molded materials made of TPO sheets.

However, with regard to environmental preservation, environment-friendly materials that can be recycled and do not generate pollutants during incineration are highly required. The materials including the PVC resin are not easily recyclable and generate acidic substances during incineration. Also, it is hard to reduce the weight because the PVC resin has a high specific gravity. And, PVC-based compositions are not suitable for concealed air bags because improvement of cold-resistance by adding plasticizers is limited.

Vacuum-molded materials made of PVC sheet and TPO sheet do not have a good finishing touch due to low surface hardness. Therefore, patterns like embossing are easily effaced. Also, it is difficult to make a PVC sheet or a TPO sheet into a complex shape, and the materials may be deformed with time due to the residual stress during molding. While the sol-molded materials have a good softness, there are still problems of variation in thickness and flow marks. Moreover, the raw materials cannot be stored for a long time due to the change in sol viscosity and other properties.

Recently, a TPO composition capable of powder-molding was developed. For example, Korean Patent Nos. 95-12102 & 95-12106 disclose an elastomer composition comprising ethylene-α-olefin copolymer rubber (containing mineral oil) partially crosslinked with polyolefin resin. However, pinholes may be formed and the flatness is poor because this composition has a low melt fluidity. Further, because of the hardness necessary to ensure good mechanical properties, other properties such as the tensile strength, low-temperature flexibility, cold-resistance and softness are poor. In addition, the folding during demolding is not restored because the molded material is hard, thereby leaving permanent folded marks.

A cost-effective thermoplastic elastomer composition that has the right combination of strength, hardness, cold resistance, moldability, and foldability so that it is useful for car interior surfaces is needed in the industry.

SUMMARY OF THE INVENTION

The inventors found out that a plastic thermoplastic elastomer composition comprising polypropylene resin, hydrogenated styrene-butadiene rubber or styrene-ethylene-butylene-styrene copolymer rubber or mixture thereof, and ethylene-octene copolymer elastomer, has a good melt fluidity and is capable of powder-molding. This composition can be used for automobile interior materials and covering materials.

Accordingly, an object of this invention is to provide a thermoplastic elastomer composition, which has a good melt fluidity and is capable of powder-molding. Another object of this invention is to provide a thermoplastic elastomer composition which has a good hardness, strength, and cold resistance to be useful for car interior surfaces. Another object of this invention is to provide car interior surfaces comprising the thermoplastic elastomer composition.

This invention includes a thermoplastic olefinic elastomer composition for powder-molding, which contains:
A) 100 parts by weight of polypropylene resin;
B) between about 50 to about 200 parts by weight of hydrogenated styrene-butadiene rubber or styrene-ethylene-butylene-styrene copolymer rubber; and
C) between about 50 to about 200 parts by weight of ethylene-octene copolymer elastomer; and
D) optionally about 0 to about 150 parts by weight of propylene-ethylene copolymer rubber.

This invention also relates to a powder material for powder-molding. The powder material is prepared by kneading the olefinic elastomer composition at high temperature to form pellets, and then crushing the pellets at very low temperature to form the powder.

DETAILED DESCRIPTION OF THE INVENTION

Hereunder is given a more detailed description of this invention. This invention includes an elastomer composition which can be easily powder-molded and has a good appearance, soft touch and mechanical properties required for automobile interior materials. The elastomer composition is made from environment-friendly thermoplastic olefinic resin and in one embodiment comprises substantially none, for example less than 1%, of vinyl chloride. Concealed passenger-seat air bag covers made of this composition will operate well even at low temperature without generating fragments.

Because polypropylene resin, hydrogenated styrene-butadiene rubber or styrene-ethylene-butylene-styrene copolymer rubber, ethylene-octene copolymer elastomer and propylene-ethylene copolymer rubber used in this invention are highly compatible, they can be easily kneaded without using compatibilizers.

This invention includes a thermoplastic olefinic elastomer composition for powder-molding, which contains: A) 100 parts by weight of polypropylene resin; B) between about 50 to about 200 parts by weight of hydrogenated styrene-butadiene rubber or styrene-ethylene-butylene-styrene copolymer rubber or mixture thereof; and C) between about 50 to about 200 parts by weight of ethylene-octene copolymer elastomer.

The polypropylene resin (A) enables the thermoplastic olefinic elastomer composition to retain proper physical properties such as tensile strength, and also enhances moldability by reducing melt viscosity during powder-molding. A recommended polypropylene resin has a melt index of 50 to 300 g/10 min (ASTM D1238), more preferably 100 to 250 g/10 min, for example about 150 g/10 min, at 230° C. and under 2.16 kg of load. If the melt index is lower than 50 g/10 min, pinholes may form and the melt condition of the back surface becomes poor. In contrast, if the melt index exceeds 300 g/10 min, the physical properties may become worsened due to the small molecular weight.

In one embodiment, the thermoplastic olefinic elastomer composition comprises between about 50 to about 200 parts by weight of hydrogenated styrene-butadiene rubber (B) for very 100 parts by weight of polypropylene resin (A). The hydrogenated styrene-butadiene rubber is added to provide flexibility, elasticity and cold-resistance to the composition. It is recommended to add 50 to 200 parts by weight, for example about 80 to about 160 parts by weight, more preferably 100 to 150 parts by weight, with reference to 100 parts by weight of polypropylene resin. If the hydrogenated styrene-butadiene rubber content is lower than 50 parts by weight, the molded material becomes hard and the cold-resistant impact property and the folding stability become worsened. In contrast, if the hydrogenated styrene-butadiene rubber content exceeds 200 parts by weight, i.e., more than twice of the hydrogenated styrene-butadiene rubber as much of the polypropylene (A), there may arise problems such as poor gelling status, embossing pattern status and moldability due to the poor melt fluidity. The melt index of the hydrogenated styrene-butadiene rubber is recommended to be 5 to 20 g/10 min, more preferably 7–15 g/10 min, at 230° C. and under 2.16 kg of load. If the melt index is lower, the moldability becomes worsened.

In the hydrogenated styrene-butadiene rubber, the styrene content is recommended to be 5 to 20%, more preferably 7 to 15%, for example about 10%. If it is lower than 5%, the melt fluidity becomes worsened. In contrast, if it exceeds 20%, flexibility, elasticity and cold-resistance becomes worsened.

In another embodiment, the thermoplastic olefinic elastomer composition comprises between about 50 to about 200 parts by weight of or styrene-ethylene-butylene-styrene copolymer rubber (B) for very 100 parts by weight of polypropylene resin (A). The styrene-ethylene-butylene-styrene copolymer rubber is added to offer flexibility, elasticity and cold-resistance to the composition. Styrene-ethylene-butylene-styrene copolymer rubber can be used instead of the hydrogenated styrene-butadiene rubber, and is advantageous in fluidity compared with the hydrogenated styrene-butadiene rubber. Accordingly, it is recommended to include 50 to 200 parts by weight, for example 110 to 190 parts by weight, of styrene-ethylene-butylene-styrene copolymer rubber with reference to 100 parts by weight of polypropylene resin. Considering the moldability, cold-resistance and folding stability, 100 to 180 parts by weight is more desirable. For the styrene-ethylene-butylene-styrene copolymer rubber, the one with 10 to 50 g/10 min of melt index, more preferably 15 to 35 g/10 min, for example about 20 g/10 min, at 230° C. and under 2.16 kg of load.

The styrene content of the styrene-ethylene-butylene-styrene copolymer rubber is recommended to be 10 to 25%, more preferably 10 to 15%, for example about 15%. If the styrene content is lower than 10%, the melt fluidity becomes worsened. In contrast, if the styrene content exceeds 25%, the flexibility, elasticity and cold-resistance become worsened.

The thermoplastic olefinic elastomer composition for powder-molding also contains between about 50 to about 200 parts by weight of ethylene-octene copolymer elastomer (C) per 100 parts by weight of polypropylene resin (A). The ethylene-octene copolymer elastomer is added to offer elasticity and softness to the molded material. The ethylene-octene copolymer elastomer is recommended to add 50 to 200 parts by weight, for example 80 to 180 parts by weight, but more preferably 70 to 150 parts by weight, with reference to 100 parts by weight of polypropylene resin. If the ethylene-octene copolymer elastomer content is lower than 50 parts by weight, the molded material becomes hard and the stability becomes worsened. In contrast, if the ethylene-octene copolymer elastomer exceeds 200 parts by weight, the physical properties become worsened. For the ethylene-octene copolymer elastomer, the one with 1 to 10, for example 1.5 to 10, more preferably 2 to 7, of Mooney viscosity ($ML_{1+4}$) at 121° C. A Shore A hardness of 50 to 80, more preferably 55 to 75, for example 72, of is recommended. If the Mooney viscosity is higher, the moldability becomes worsened due to a low melt fluidity. In contrast, if the Mooney viscosity is lower, the physical properties become worsened. And, if the Shore A hardness is higher, the flexibility and elasticity of the molded material becomes deteriorated.

In one embodiment of the invention, the thermoplastic olefinic elastomer composition for powder-molding additionally contains a propylene-ethylene copolymer rubber. While the propylene-ethylene copolymer rubber is disadvantageous in rigidity compared with the polypropylene resin, it is effective to at least partially replace the expensive rubber content. Further, the propylene-ethylene copolymer rubber improves moldability due to a good flexibility and melt fluidity. The propylene-ethylene copolymer rubber is recommended to add 0 to 150 parts by weight, for example 5 to 150 parts by weight, more preferably 20 to 100 parts by weight, with reference to 100 parts by weight of polypropylene resin. If its content is lower than 20 parts by weight, the improvement of flexibility and fluidity is insufficient. In contrast, if it exceeds 100 parts by weight, the physical properties and cold-resistance become worsened. And, for the propylene-ethylene copolymer rubber, it is recommended to use the one with 3 to 50 g/10 min, more preferably 5 to 40 g/10 min, of melt index at 230° C. and under 2.16 kg of load. If the melt index is higher, the physical properties and cold-resistance become worsened due to low molecular weight of the resin. In contrast, if the melt index is lower, the moldability becomes worsened. The recommended Shore D hardness is 20 to 40, more preferably 25 to 35. If the Shore D hardness is higher, the rubber content cannot be reduced substantially and the molded material becomes hard, due to low flexibility.

In addition to the above contents, additives can be further added to the composition for a variety of purposes. Because polypropylene resin, hydrogenated styrene-butadiene rubber or styrene-ethylene-butylene-styrene copolymer rubber, ethylene-octene copolymer elastomer and optionally propylene-ethylene copolymer rubber used in this invention are highly compatible, they can be easily kneaded without using compatibilizers. In one embodiment there is substantially no, that is, less than about 1 part per 100 parts polypropylene resin, of compatibilizers. However, additives such as fillers, antioxidants, UV-absorbers, pigments, wettability modifiers, and the like can be included in minor amounts, so long as the resulting composition has the required properties. This list is not exhaustive. The kind and content, typically less than 10 parts per 100 parts of polypropylene, of such additives can be determined by the one skilled in the art.

The preparing method of the olefinic thermoplastic elastomer composition of this invention is as follows.

The polypropylene resin, hydrogenated styrene-butadiene rubber or styrene-ethylene-butylene-styrene copolymer rubber, ethylene-octene copolymer elastomer, optionally propylene-ethylene copolymer rubber, and optionally other additives are dry-blended in a tumbling mixer or a fast-rotating mixer. In one embodiment, the formulation can include polypropylene resin, hydrogenated styrene-butadiene rubber, styrene-ethylene-butylene-styrene copolymer rubber, ethylene-octene copolymer elastomer and optionally propylene-ethylene copolymer rubber and/or other additives, so long as the amount of hydrogenated styrene-butadiene rubber and styrene-ethylene-butylene-styrene copolymer rubber together is between about 50 and 200 parts by weight compared to 100 parts of polypropylene.

The mixture is kneaded at a temperature of between about 150° C. to 240° C. in for example a twin-screw extruder or a Banbury mixer, and the well mixed thermoplastic formulation is advantageously kneaded into pellets. The pellets are frozen below about −190° C., for example with liquid nitrogen, and crushed with a disk mill to prepare an olefinic thermoplastic elastomer powder that can pass a 40-meshed Taylor standard mesh.

The composition prepared according to a preferred embodiment of this invention has the following physical properties: Shore A hardness (softness) is 60 to 85; Tensile strength is 60 to 120 kg/cm$^2$; and Cold-resistance is lower than −50° C. Therefore, the composition has physical properties required for automobile interior materials. Accordingly, it can be used for interior surface materials or covering materials like instrument panels and concealed air bags. Also, it has good tensile strength, flexibility and folding stability, and the molded material can be easily recycled and does not generate acidic substances during incineration. In a preferred embodiment, the composition has less than about 0.1% by weight of halogens, such as would be supplied by PVC. In addition, the improved moldability due to a high melt fluidity reduces pinhole formation on the surface of the molded material and offers a good fluidity.

The following examples are to be illustrative of this invention and should not be construed as limiting the scope of this invention.

EXAMPLES 1 to 8 & COMPARATIVE EXAMPLES 1 to 8

Olefinic thermoplastic elastomer compositions, having compositions as shown in Table 1, were prepared by dry-blending polypropylene resin, hydrogenated styrene-butadiene rubber or styrene-ethylene-butylene-styrene copolymer rubber, ethylene-octene copolymer elastomer, and in some cases propylene-ethylene copolymer rubber, in a fast-rotating mixer at a temperature sufficient to form a well-mixed kneaded thermoplastic composition. Pellets were formed. The pelletized compositions were frozen at below −190° C. with liquid nitrogen and crushed with a disk mill to obtain olefinic thermoplastic elastomer powder that can pass through a 40-meshed Taylor standard mesh.

Molding samples were prepared from the powder as follows. The powder was put in a 20×20 cm box, and 20×20 cm flat electro-mold with embossing patterns at 240° C. was connected with the powder box. The mold and the powder box were rotated three times clockwise and counterclockwise, respectively. Then, residual powders adhering to the mold were removed. The mold was separated and the molded sheet samples were prepared by heating for 1 min in at 270° C. of heating furnace followed by cooling in water.

TABLE 1

| Composition | Examples | | | | | | | | Comparative Examples | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| 1. Polypropylene resin | | | | | | | | | | | | | | | | |
| Melt index = 150 | 100 | 100 | 100 | 100 | 100 | 100 | 100 | 100 | 100 | 100 | — | 100 | 100 | 100 | 100 | 100 |
| Melt index = 30 | — | — | — | — | — | — | — | — | — | — | 100 | — | — | — | — | — |
| 2. Propylene-ethylene copolymer resin | | | | | | | | | | | | | | | | |
| Melt index = 8; Shore D hardness = 30 | | | | | | | 60 | 30 | — | 100 | 100 | — | 80 | 160 | — | — |
| Melt index = 10; Shore D hardness = 45 | — | — | — | — | — | — | — | — | — | — | — | 100 | — | — | — | — |
| 3. Hydrogenated butadiene rubber | | | | | | | | | | | | | | | | |
| Melt index = 10; Styrene content = 10% | 160 | 90 | 80 | — | — | — | 120 | — | 200 | — | 30 | 220 | 40 | — | — | — |
| Melt index = 3; Styrene content = 10% | — | — | — | — | — | — | — | — | — | — | — | — | — | 100 | — | — |

TABLE 1-continued

|  | Examples | | | | | | | | Comparative Examples | | | | | | | |
| --- | --- | --- | --- | --- | --- | --- | --- | --- | --- | --- | --- | --- | --- | --- | --- | --- |
| Composition | 1 | 2 | 3 | 4 | 5 | 6 | 7 | 8 | 1 | 2 | 3 | 4 | 5 | 6 | 7 | 8 |
| 4. Styrene-ethylene-butylene-styrene copolymer rubber | | | | | | | | | | | | | | | | |
| Melt index = 20; Styrene content = 15% | — | — | — | 180 | 110 | 150 | — | 190 | — | — | — | — | — | — | — | — |
| Melt index = 1; Styrene content = 53% | — | — | — | — | — | — | — | — | — | — | — | — | — | — | — | — |
| 5. Ethylene-octene copolymer elastomer | | | | | | | | | | | | | | | | |
| $ML_{1+4}$ @ 121□ = 1.5; Shore A hardness = 72 | 100 | 150 | 130 | 80 | 140 | 120 | 180 | 140 | 40 | 220 | 220 | 40 | — | 100 | — | — |
| $ML_{1+4}$ @ 121□ = 30; Shore A hardness = 85 | — | — | — | — | — | — | — | — | — | — | — | — | 100 | — | — | — |
| 6. Dielectric EPDM | | | | | | | | | | | | | | | | |
| $ML_{1+4}$ @ 100□ = 53; Mineral oil content = 50% | — | — | — | — | — | — | — | — | — | — | — | — | — | — | 100 | 230 |

For the compositions prepared by above Examples and Comparative Examples, physical properties were determined as follows.

For the prepared molded sheets, pinhole generation and fluid status were examined with the naked eye and rated to evaluate the moldability. The pinhole generation was rated as 1 to 5 points, according to the pinhole distribution on the sheet surface: i.e., 5 points for no pinhole generation; 1 point for severe pinholes on the entire surface; and 2 to 4 points for intermediate levels.

The fluid status was also rated as 1 to 5 points. 5 points was given for smooth and flat molded sheets; 1 point for severely rugged sheets; and 2 to 4 points for intermediate levels.

Further, flexibility, physical properties and cold-resistance were determined by measuring Shore A hardness (ASTM D2240), tensile strength (ASTM D638) and brittleness temperature (JIS K6723).

The folding stability was determined by folding the 2×10 cm molded sheet in half, pressing the folded part with a 5 kg of weight for 1 min, and measuring the angle of the folded part after removing the weight.

The physical properties of the Examples 1 to 8 and the Comparative Examples 1 to 8 is shown in Table 2.

As shown in Table 2, the molded sheets made from the compositions of Examples 1–8 either had no pinholes or only a few pinholes, which were much less than those observed for the Comparative Examples. The Examples 1 to 8 also showed an improved fluid status than those of Comparative Examples.

Further, physical properties, such as hardness and tensile strength satisfied the requirements of interior materials. The Shore A hardness of the examples ranged from 68 to 81 Shore A, which is sufficient for use in automobile interior surfaces. The tensile strength of the examples ranged from 71 to 112 kg/sq. cm., which is sufficient for use in automobile interior surfaces.

During removal of molded surfaces from molds, and during installation, it is usually necessary to bend the molded surface. Advantageously, the material recovers its original shape after bending. The bending test performed on the Examples and Comparative Examples was severe. The Examples had a restored angle of between 132 and 169 degrees. The comparative examples, on the other hand, had a restored angle of between 80 and 121 degrees. The restoring angle exhibited by the sheets in Examples 1 to 8 were much superior to those in Comparative Examples, and therefore the problem of a folded mark in caused during demolding and treating the molded materials may be solved.

TABLE 2

|  | Examples | | | | | | | | Comparative Examples | | | | | | | |
| --- | --- | --- | --- | --- | --- | --- | --- | --- | --- | --- | --- | --- | --- | --- | --- | --- |
| Test Result | 1 | 2 | 3 | 4 | 5 | 6 | 7 | 8 | 1 | 2 | 3 | 4 | 5 | 6 | 7 | 8 |
| Pinholes | 4 | 5 | 5 | 4 | 4 | 4 | 5 | 5 | 3 | 3 | 1 | 1 | 2 | 2 | 2 | 2 |
| Fluid status | 4 | 4 | 5 | 4 | 4 | 4 | 5 | 5 | 2 | 3 | 1 | 1 | 2 | 2 | 2 | 2 |
| Hardness (Shore A) | 68 | 71 | 75 | 69 | 70 | 68 | 81 | 73 | 70 | 92 | 88 | 89 | 94 | 97 | 95 | 87 |
| Tensile strength (kg/cm$^2$) | 71 | 84 | 90 | 79 | 81 | 72 | 112 | 93 | 56 | 131 | 45 | 71 | 138 | 143 | 130 | 62 |
| Restoring angle (°) | 169 | 157 | 145 | 162 | 157 | 163 | 132 | 141 | 121 | 91 | 110 | 105 | 86 | 81 | 80 | 118 |
| Cold-resistance (□) | −63 | −61 | −57 | −63 | −59 | −62 | −61 | −67 | −45 | −38 | −36 | −35 | −33 | −34 | −38 | −46 |

As explained above, the olefinic thermoplastic elastomer composition of this invention has a good melt fluidity to be used in the manufacture of high-quality powder-molding products, and superior tensile strength, flexibility and folding stability to be used for automobile interior surface materials or covering materials like instrument panels. In particular, since the composition has good cold-resistance, it can be used for instrument panel surface materials of concealed passenger-seat air bags, which are showing a tendency of increase in new cars, because it has no problems fragments and cracks even at low temperature. Also, it is an environment-friendly material which can be easily recycled and does not generate acidic substances during incineration.

What is claimed is:

1. A thermoplastic olefinic elastomer composition for powder-molding comprising:
    (a) 100 parts by weight of polypropylene resin;
    (b) 50 to 200 parts by weight of hydrogenated styrene-butadiene rubber or styrene-ethylene-butylene-styrene copolymer rubber;
    (c) 50 to 200 parts by weight of ethylene-octene copolymer elastomer; and
    (d) 5 to 150 parts by weight of propylene-ethylene copolymer rubber.

2. The thermoplastic olefinic elastomer composition for powder-molding according to claim 1, wherein:
    the polypropylene resin has 50 to 300 g/10 min of melt index (ASTM D1238) at 230° C. and under 2.16 kg of load;
    the hydrogenated styrene-butadiene rubber has 5 to 20 g/10 min of melt index at 230° C. and under 2.16 kg of load, and 5 to 20% of styrene content;
    the styrene-ethylene-butylene-styrene copolymer rubber has 10 to 50 g/10 min of melt index at 230° C. and under 2.16 kg of load, and 10 to 25% of styrene content; and
    the ethylene-octene copolymer elastomer has 1 to 10 of Mooney viscosity ($ML_{1+4}$, ASTM D 927) at 121° C., and 50 to 80 of Shore A hardness (ASTM D 2240); and
    the propylene-ethylene copolymer rubber has 3 to 50 g/10 min of melt index at 230° C. and under 2.16 kg of load, and 20 to 40 of Shore D hardness (ASTM D2240).

3. An interior surface for an automobile, wherein said surface comprises a thermoplastic olefinic elastomer composition comprising:
    A) 100 parts by weight of polypropylene resin having a melt index of 50 to 300 g/10 min (ASTM D1238) at 230° C. and under 2.16 kg of load;
    B) 50 to 200 parts by weight of styrene-ethylene-butylene-styrene copolymer rubber having a melt index of 10 to 50 g/10 min at 230° C. and under 2.16 kg of load; and
    C) 50 to 200 parts by weight of ethylene-octene copolymer elastomer having a Mooney viscosity ($ML_{1+4}$) at 121° C. of 1 to 10 and a hardness of 50 to 80 Shore A; and
    D) about 5 to about 150 parts by weight of propylene-ethylene copolymer rubber having a melt index of 3 to 50 g/10 min at 230° C. and under 2.16 kg of load, and a hardness of 20 to 40 Shore D.

4. The interior surface for an automobile of claim 3, wherein the polypropylene resin has a melt index of 100 to 250 g/10 min (ASTM D1238) at 230° C. and under 2.16 kg of load, and wherein the thermoplastic olefinic elastomer composition comprises:
    A) about 100 to about 180 parts by weight styrene-ethylene-butylene-styrene copolymer rubber styrene wherein the styrene content of the styrene-ethylene-butylene-styrene copolymer rubber is 10 to 25%, or 50 to 200 parts by weight of a mixture of the above-described styrene-ethylene-butylene-styrene copolymer rubber and hydrogenated styrene butadiene rubber with a styrene content of about 5 to 20%; and
    B) 70 to 150 parts by weight of ethylene-octene copolymer elastomer.

5. The interior surface for an automobile of claim 3, wherein the thermoplastic olefinic elastomer composition comprises:
    A) about 100 to about 180 parts by weight styrene-ethylene-butylene-styrene copolymer rubber having a melt index of 15 to 35 g/10 min at 230° C. and under 2.16 kg of load; and
    B) 70 to 150 parts by weight of ethylene-octene copolymer elastomer having a Mooney viscosity ($ML_{1+4}$) at 121° C. of 2 to 7 and a hardness of 55 to 75 Shore A.

6. The interior surface for an automobile of claim 3, wherein the thermoplastic olefinic elastomer composition comprises substantially no vinyl chloride.

7. The interior surface for an automobile of claim 3, wherein the thermoplastic olefinic elastomer composition consists essentially of:
    A) 100 parts by weight of polypropylene resin having a melt index of 50 to 300 g/10 min (ASTM D1238) at 230° C. and under 2.16 kg of load;
    B) 50 to 200 parts by weight styrene-ethylene-butylene-styrene copolymer rubber having a melt index of 10 to 50 g/10 min at 230° C. and under 2.16 kg of load; and
    C) 50 to 200 parts by weight of ethylene-octene copolymer elastomer having a Mooney viscosity ($ML_{1+4}$) at 121° C. of 1 to 10 and a hardness of 50 to 80 Shore A;
    D) about 5 to about 150 parts by weight of propylene-ethylene copolymer rubber having a melt index of 3 to 50 g/10 min at 230° C. and under 2.16 kg of load, and a hardness of 20 to 40 Shore D; and
    E) less than about 10 parts by weight of additives.

8. The interior surface for an automobile of claim 7, wherein the polypropylene resin has a melt index of 100 to 250 g/10 min (ASTM D1238) at 230° C. and under 2.16 kg of load,
    and wherein the thermoplastic olefinic elastomer composition contains about 100 to about 180 parts by weight styrene-ethylene-butylene-styrene copolymer rubber wherein the styrene content of the styrene-ethylene-butylene-styrene copolymer rubber is 10 to 25%, or 50 to 200 parts by weight of a mixture of hydrogenated styrene-butadiene rubber and styrene-ethylene-butylene-styrene copolymer rubber; and 70 to 150 parts by weight of ethylene-octene copolymer elastomer.

9. The interior surface for an automobile of claim 3, wherein the styrene content of the styrene-ethylene-butylene-styrene copolymer rubber is 10 to 15%, and the ethylene-octene copolymer elastomer has a Mooney viscosity ($ML_{1+4}$) at 121° C. of 2 to 7 and a hardness of 55 to 75 Shore A.

10. The interior surface for an automobile of claim 3, wherein the surface has a hardness of 60 to 85 Shore A, a tensile strength of 60 to 120 kg/cm$^2$; and a brittleness temperature as determined by the JIS K6723 standard of lower than −50° C.

11. The interior surface for an automobile of claim 7, wherein the surface has a hardness of 60 to 85 Shore A, a tensile strength of 60 to 120 kg/cm²; and a brittleness temperature as determined by the JIS K6723 standard of lower than −50° C.

12. A method for preparing a thermoplastic olefinic elastomer composition for powder-molding comprising:

A) kneading a thermoplastic olefin composition in a heated mixer or extruder to provide pellets comprising:
  a) 100 parts by weight of polypropylene resin having a melt index of 50 to 300 g/10 min (ASTM D1238) at 230° C. and under 2.16 kg of load;
  b) 50 to 200 parts by weight of hydrogenated styrene-butadiene rubber having a melt index of 5 to 20 g/10 min at 230° C. and under 2.16 kg of load, or styrene-ethylene-butylene-styrene copolymer rubber having a melt index of 10 to 50 g/10 min at 230° C. and under 2.16 kg of load, or mixture thereof;
  c) 50 to 200 parts by weight of ethylene-octene copolymer elastomer having a Mooney viscosity ($ML_{1+4}$) at 121° C. of 1 to 10 and a hardness of 50 to 80 Shore A;
  d) about 5 to about 150 parts by weight of propylene-ethylene copolymer rubber having a melt index of 3 to 50 g/10 min at 230° C. and under 2.16 kg of load, and a hardness of 20 to 40 Shore D; and
  e) optionally about 0 to about 10 parts by weight of additives;

B) freezing the pellets to a temperature below about −190° C.;

C) crushing the pellets to form a powder that can pass a 40-meshed Taylor standard mesh.

13. The method of claim 12 wherein the thermoplastic olefinic elastomer composition for powder-molding consists essentially of:

a) 100 parts by weight of polypropylene resin having a melt index of 50 to 300 g/10 min (ASTM D1238) at 230° C. and under 2.16 kg of load;

b) 50 to 200 parts by weight of hydrogenated styrene-butadiene rubber having a melt index of 5 to 20 g/10 min at 230° C. and under 2.16 kg of load, or styrene-ethylene-butylene-styrene copolymer rubber having a melt index of 10 to 50 g/10 min at 230° C. and under 2.16 kg of load, or mixture thereof; and c) 50 to 200 parts by weight of ethylene-octene copolymer elastomer having a Mooney viscosity ($ML_{1+4}$) at 121° C. of 1 to 10 and a hardness of 50 to 80 Shore A;

d) about 5 to about 150 parts by weight of propylene-ethylene copolymer rubber having a melt index of 3 to 50 g/10 min at 230° C. and under 2.16 kg of load, and a hardness of 20 to 40 Shore D; and e) less than about 10 parts by weight of additives.

14. A interior surface for an automobile, wherein the interior surface was made from the thermoplastic olefinic elastomer composition for powder-molding product of claim 12, and wherein the surface has a hardness of 60 to 85 Shore A, a tensile strength of 60 to 120 kg/cm²; and a brittleness temperature as determined by the JIS K6723 standard of lower than −50° C.

15. A thermoplastic olefinic elastomer material for powder-molding prepared by crushing the pellets at an extremely low temperature, which is obtained by kneading said composition according to claim 1 at high temperature.

* * * * *